United States Patent [19]

Gautier et al.

[11] Patent Number: 5,233,908
[45] Date of Patent: Aug. 10, 1993

[54] PNEUMATIC BOOSTER WITH DOUBLE-PURPOSE ANNULAR VOLUME

[75] Inventors: Jean-Pierre Gautier; Ulysse Verbo, both of Aulnay-sous-Bois, France

[73] Assignee: Bendix Europe Services Techniques, Drancy, France

[21] Appl. No.: 860,461

[22] Filed: Mar. 30, 1992

[30] Foreign Application Priority Data

Apr. 17, 1991 [FR] France .................... 91 04703

[51] Int. Cl.⁵ .............................................. F15B 9/10
[52] U.S. Cl. .................................................. 91/376 R
[58] Field of Search ............... 91/369.1, 369.2, 369.3, 91/369.4, 376 R

[56] References Cited

U.S. PATENT DOCUMENTS 3,149,539 9/1964 Prather .
4,598,548 7/1986 Wagner ........................ 91/369.2

FOREIGN PATENT DOCUMENTS 2537524 6/1984 France .
2546461 11/1984 France .
2116270 9/1983 United Kingdom ............... 91/369.2
2140518 11/1984 United Kingdom .

*Primary Examiner*—Edward K. Look
*Assistant Examiner*—F. Daniel Lopez
*Attorney, Agent, or Firm*—Larry J. Palguta; Ken C. Decker

[57] ABSTRACT

The invention relates to a pneumatic brake booster comprising a casing (10), within which is located a piston (22, 14, 102) formed from a rear tubular part (22) supporting a skirt (14) and, by way of an unrolling diaphragm (12), defining a front chamber (16) connected permanently to a vacuum source and a rear chamber (18) connected selectively to the front chamber (16) or to the atmosphere by a valve mechanism (136, 138, 140) actuated by a control rod (34) capable of bearing by way of a plunger (32) on one of the faces of a reaction disk (58) fixed to a push rod (56), the valve mechanism (136, 138, 140) possessing a shutter (138) made rigid by an insert (118) and interacting by an active part with a first valve seat (136) formed on the plunger (32) and with a second valve seat (140) formed on the piston (14), the shutter (138) being formed by a flexible tubular diaphragm (114), the active part of the shutter (138) being located between the two ends (112, 116) of the flexible tubular diaphragm (114), a stop member (152) determining simultaneously the rest position of the piston (22, 14, 102) and the rest position of the plunger (32). According to the invention, the piston (22, 14, 102) comprises, furthermore, an intermediate piston web (102) defining with the skirt (14) of the piston an annular volume (123), the first (136) and second (140) valve seats and the shutter (138) are arranged in the annular volume (123), and the second valve sheet (140) is formed on the skirt (14) of the piston.

7 Claims, 2 Drawing Sheets

PNEUMATIC BOOSTER WITH DOUBLE-PURPOSE ANNULAR VOLUME

The present invention relates to pneumatic boosters, more particularly those of the type used to provide braking systems for motor vehicles.

Boosters of this type conventionally comprise a piston having a rear tubular part and a skirt and, with the aid of an unrolling diaphragm, defining a front chamber connected permanently to a vacuum source and a rear chamber connected selectively to the front chamber or to the atmosphere by a valve means actuated by a control rod capable of bearing by means of a plunger on one of the faces of a reaction disk fixed to a push rod, the valve means comprising a shutter interacting by an active part made rigid by an insert with a first valve seat formed on the plunger and with a second valve seat formed on the piston, the shutter being formed by a flexible tubular diaphragm, the active part of the shutter being located between the two ends of the flexible tubular diaphragm, and a stop member determining simultaneously the rest position of the piston and of the plunger.

Such boosters, as illustrated, for example, in the document GB-A-2,064,690, have some disadvantages. Thus, to prevent the control rod from having too long an idle travel, it is necessary to design the valve means in such a way that the "shutter lift" between the shutter and the second valve seat is as small as possible. The result of this is that, during braking, the passage presented to the atmospheric air towards the rear chamber is reduced, as is the passage presented to the air of the rear chamber towards the front chamber during brake release. The functioning of these boosters is therefore accompanied by air-suction noises which can become troublesome, the more so because the structure of the hub of the piston, having a single radial passage towards the rear chamber and a single axial passage towards the front chamber, also induces pronounced turbulence in the moving air.

The document FR-A-2,546,461 likewise makes known a booster which comprises a control housing containing the shutter controlling the pressure difference between the front and rear chambers. This control housing is produced in two parts sliding telescopically one in the other, the first being fastened to the unrolling diaphragm and, at rest, bearing against the active part of the shutter by means of the second valve seat. To reduce the idle travel of this booster, the face of the shutter opposite that forming the active part bears by means of a sleeve against the second part of the control housing retained by the casing of the booster via an annular gasket. Such a booster, besides being of highly complex structure, itself has the disadvantage of noisy functioning.

The document U.S. Pat. No. -A-4 598 548 makes an attempt to solve these drawbacks, but still comprises a conventional valve means housed in the tubular central part formed at the rear part of the booster casing. This latter must then be of a special design. Moreover, according to this document, the structure of the piston hub has a single radial passage towards the rear chamber and a single axial passage towards the front chamber, also inducing pronounced turbulences in the moving air, detrimental for the response time of the booster by the slowing of the air they impose, and generating noises when functioning.

An object of the present invention is therefore to design a booster, the idle travel of which is as small as possible and, at the same time, which functions silently, this being achieved in a simple, reliable and economical way.

For this purpose, the subject of the invention is a booster, in which the relative position at rest of the first and second valve seats is perfectly defined, and in which the air passages between the atmosphere and the rear chamber on the one hand and the rear chamber and the front chamber on the other hand have the largest possible cross-section, without presenting obstacles capable of generating turbulence.

According to the present invention, the piston comprises, furthermore, an intermediate piston web defining with the skirt of the piston an annular volume, the first and the second valve seats and the shutter are arranged in the annular volume, and the second valve seat is formed on the skirt of the piston.

According to an advantageous characteristic of the invention, orifices are made in the skirt and in the intermediate web in order to put the annular volume in communication with the front chamber and the rear chamber.

According to another advantageous characteristic of the invention, the second valve seat formed on the piston is formed on the skirt of this piston.

The invention will now be described by way of example with reference to the accompanying drawings in which:

FIG. 1 shows part of a brake booster intended to be placed in the conventional way between the brake pedal of a vehicle and the master cylinder controlling the hydraulic brake circuit of this vehicle. By convention, the part of the booster facing the master cylinder is called the front of the booster and the part facing the brake pedal its rear.

Figure 1:
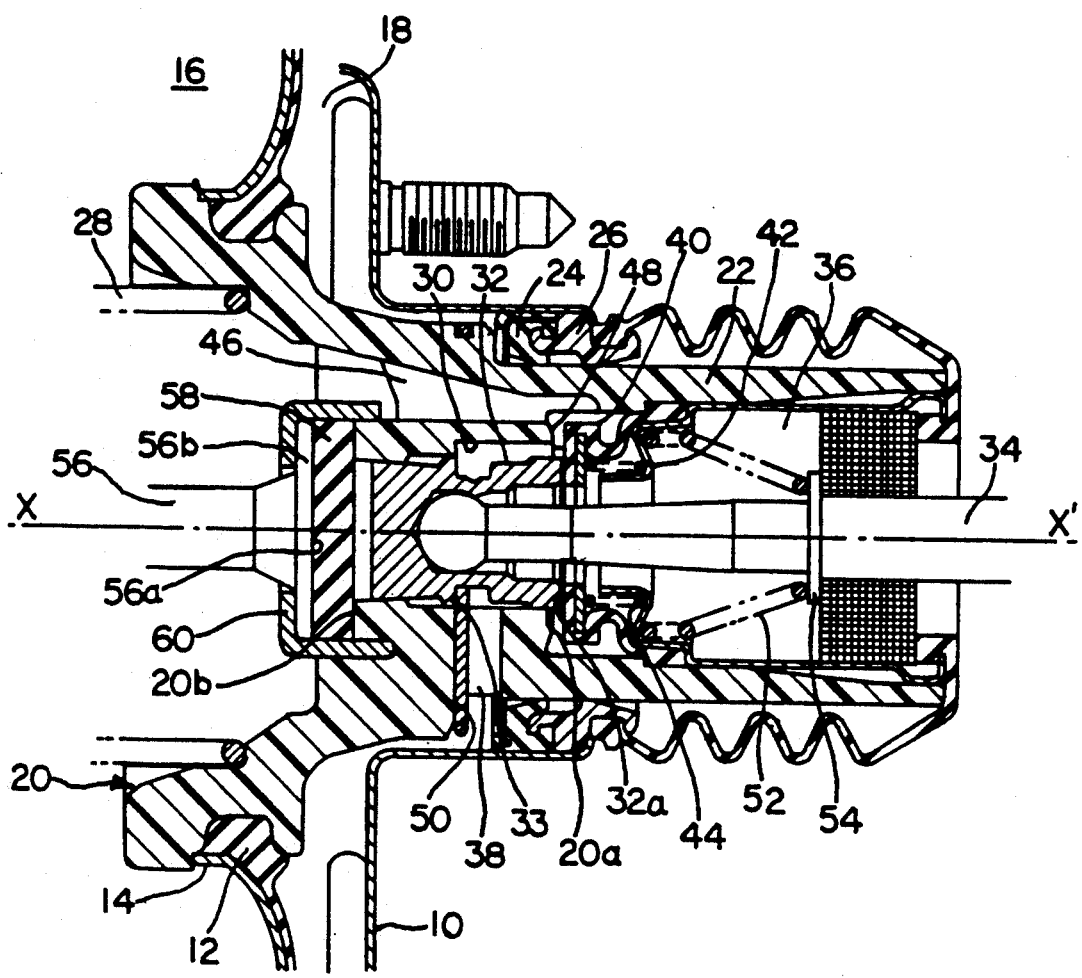
FIG. 1 is a side view in longitudinal section illustrating the central part of a pneumatic brake booster of known type, for example from the abovementioned document GB-A-2,064,690.

The booster of FIG. 1 comprises a shell-shaped outer casing 10 having rotational symmetry about an axis X—X'. Only the rear central part of this casing 10 is shown in FIG. 1.

A flexible elastomeric unrolling diaphragm 12, reinforced in its central part by a metal support disk 14, also called a skirt, defines within the space delimited by the casing 10 a front chamber 16 and a rear chamber 18. The outer peripheral edge (not shown) of the diaphragm 12 is fastened sealingly to the outer casing 10. The inner peripheral edge of this same diaphragm terminates in a bead received sealingly in an annular groove formed on the outer peripheral surface of a hollow boost piston 20 arranged along the axis X—X' of the booster. This hollow piston 20 is extended rearwards in the form of a tubular part 22 which passes sealingly through the rear wall of the casing 10. The sealing of this passageway is ensured by a reinforced annular gasket 24 which is fastened by means of a ring 26 in a tubular central part extending the rear wall of the casing 10 rearwards.

A compression spring 28 interposed between the piston 20 and the front wall (not shown) of the outer casing 10 normally keeps the piston 20 and the skirt 14 in a rear rest position, illustrated in FIG. 1, in which the rear chamber 18 is at its minimum volume and the front chamber 16 at its maximum volume.

In its central part located between the tubular rear part 22 and the front part in which the diaphragm 12 and the skirt 14 are fastened, the piston 20 has a bore 30, in which is received slideably a plunger 32 likewise having rotational symmetry about the axis X—X'. The front end of a control rod 34 of the booster, likewise arranged along the axis X—X', is mounted in the plunger 32 in the manner of a ball joint. The rear end (not shown) of this rod 34 which projects outside the tubular part 22 of the piston 20 is controlled directly by the brake pedal (not shown) of the vehicle.

The annuar space 36 delimited between the control rod 34 and the tubular part of the piston 20 opens out towards the outer atmosphere at the rear of the booster, for example by way of an air filter. Towards the front, this same annular space can communicate with the rear chamber 18 via a radial passage 38 formed in the central part of the piston, when boost means controlled by the plunger 32 are actuated.

Conventionally, these booster means comprise a three-way valve having an annular shutter 40 mounted in the tubular part of the piston and two annular valve 20a and 32a formed respectively on the central part of the piston 20 and on the plunger 32.

The shutter 40 forms the front end, of smaller diameter, of a flexible elastomeric sleeve, the rear end of which terminates in a bead mounted sealingly inside the tubular part 22 of the piston 20. This bead is held in place by a metal cup 42, on which bears a compression spring 44 tending to displace the shutter 40 forwards.

The annular valve seat 32a is formed on the rear end face of the plunger 32. Comparably, the annular valve seat 20a is formed on the rear end face of the central part of the piston 20 around the seat 32a. Depending on the position of the plunger 32 within the piston 20, this arrangement allows the shutter 40 constantly to bear sealingly on at least one of the valve seats 32a and 20a under the action of the spring 44.

A second passage 46 is formed in the central part of the piston 20 approximately in parallel with its axis X—X', in order to put the front chamber 16 of the booster in communication with an annular chamber 48 formed around the shutter 40 within the tubular part 22 of the piston 20. When the plunger 32 occupies its rear rest position, illustrated in FIG. 1, in which the shutter 40 bears sealingly on the seat 32a of the plunger 32 and is set apart from the seat 20a of the piston 20, the front 16 and rear 18 chambers of the booster thus communicate with one another via the passage 46, the annular chamber 48 and the passage 38.

In a way itself also conventional, at least one stop member 50 mounted in the central part of the piston 20 delimits the axial stroke of the plunger 32 within the latter. The plunger 32 is normally maintained in the rear rest position by the coming of an annular shoulder 33 of the plunger up against the stop member 50, also called a stop key, by means of a compression spring 52 interposed between the cup 42 and a washer 54, itself bearing on a shoulder formed on the control rod 34.

In its central part, the piston 20 has an annular front face 20b at the center of which the bore 30 opens out. This annular front face 20b of the piston 20 acts on the rear face 56a of a push rod 56 via a reaction disk 58 made of a deformable material, such as an elastomer. More specifically, the push rod 56 and the reaction disk 58 are arranged along the axis X—X' of the booster in the extension of the control rod 34 and of the plunger 32. The rear surface 56a of the push rod 56 is formed on a disk-shaped plate 56b constituting the rear end of the rod 56. The plate 56b and the reaction disk 58 are covered by a cap 60 centered on the axis X—X' of the booster and interacting with an annular groove formed on the central part of the piston 20 around the annular front face 20b of the latter.

The functioning of this known booster is conventional and can be described concisely as follows.

When the booster is installed on a vehicle, the front chamber 16 communicates permanently with a vacuum source.

The stop member 50 is mounted without play in the central part of the piston 20. The idle travel of this booster is determined by the difference between the dimension between the front reference face of the stop member 50 (up against which the shoulder 33 of the plunger 32 comes) and the annular valve seat 20a of the piston 20, and the dimension between the shoulder 33 and the annular valve seat 32a of the plunger 32.

In a first step, the effect of the depression of the brake pedal by the driver is to equalize the prestressing force of the spring 52 less the prestressing force of the spring 44. During this slight displacement of the control rod 34 and of the plunger 32, under the action of the spring 44 the shutter 40 follows the seat 32a of the plunger 32 until it comes into contact with the seat 20a of the piston; the front 16 and rear 18 chambers of the booster are then isolated from one another. The stroke of the control rod 34 and of the plunger 32 corresponding to this first actuating phase corresponds to the idle travel of the booster, as explained above. It is therefore liable to vary according to the production tolerances of the piston and plunger.

In a second phase of the actuation of the brake, the plunger 32 is displaced sufficiently forwards for the shutter 40 to be in sealing contact with the seat 20a of the piston and to begin to move away from the seat 32a of the plunger. Under these conditions, the rear chamber 18 of the booster is isolated from the front chamber 16 and comes into communication with the atmosphere.

The rear chamber 18, which previously communicated with the front chamber 16 and was therefore under a reduced pressure, therefore sucks air at atmospheric pressure through the valve passage of small cross-section between the shutter 40 and the plunger seat 32a. A major obstacle to the passage of the air thus results. Moreover, the air which comes, for example, from the upper half of FIG. 1 in order to penetrate into the passage 38, will have to pass round the control rod 34 and the plunger 32 so as to arrive at the radial passage 38, thus resulting in a turbulent and noisy flow of the air in addition to the whistling attributable to passage through the gap between the shutter 40 and the plunger seat 32a.

The same phenomena occur during a brake release, when the air under a higher pressure is made to pass from the rear chamber 18 towards the front chamber 16 via the radial passage 38, the chamber 48 around the plunger 32, the gap between the shutter 40 and the piston seat 20a and the axial passage 46. These phenomena will therefore not be described in detail.

It will therefore be understood that it is highly desirable to provide a booster which has a reduced idle travel and where, at the same time, the cross-section presented to the passage of the air is as large as possible, the air flow having the least possible turbulence.

Figure 2:
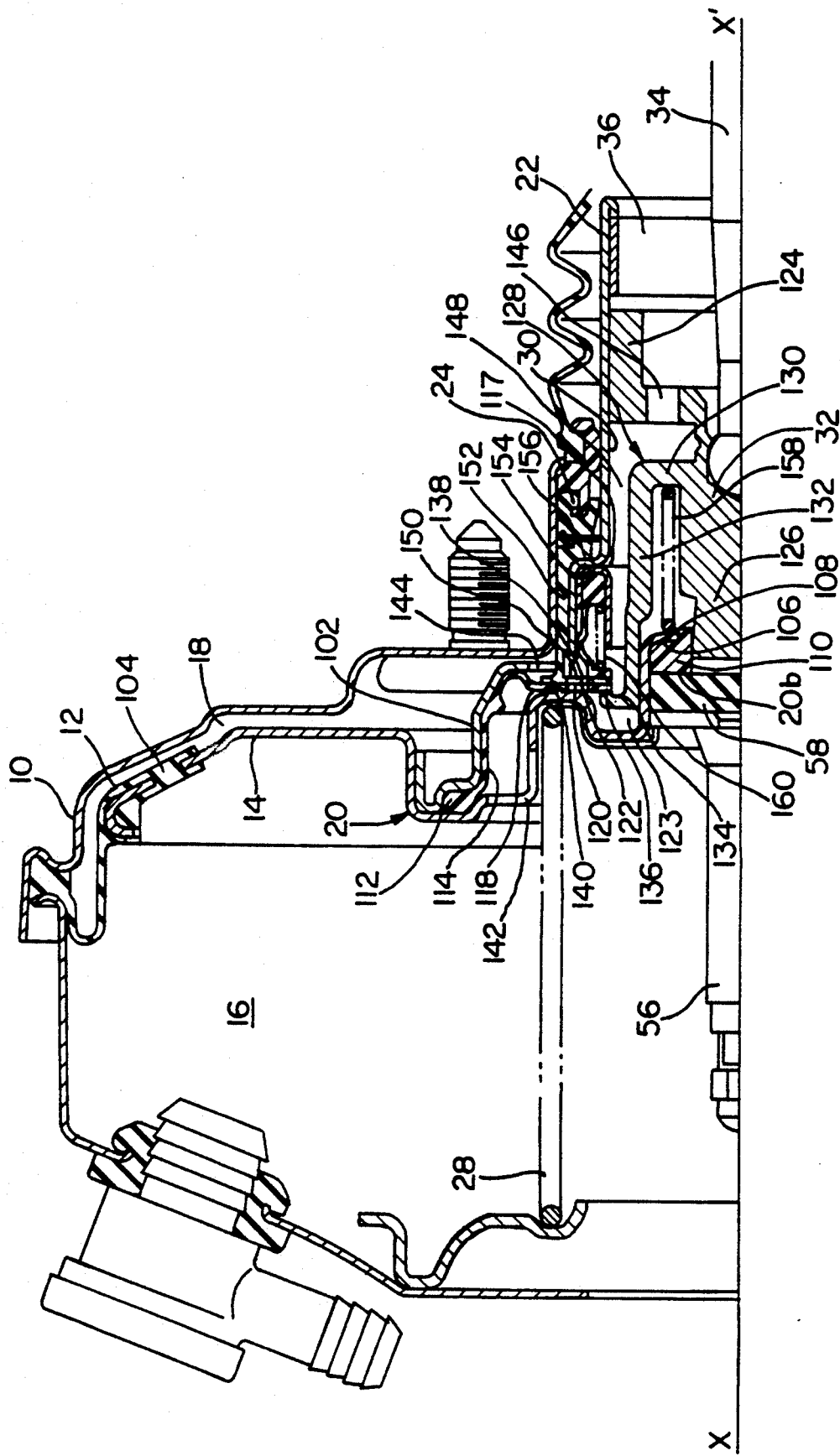
FIG. 2 is a side view in longitudinal half-section illustrating the central part of a pneumatic brake booster produced according to the present invention.

This object is achieved by means of the invention, an exemplary embodiment of which is illustrated in FIG. 2 where the elements identical to those of FIG. 1 bear the same reference numerals.

It can be seen from FIG. 2 that the piston and plunger have been thoroughly modified in order to achieve this object. The piston is composite, it comprises a tubular rear part 22 and a front part of revolution about the axis X—X' forming an intermediate piston web 102 of general approximately frustoconical shape. Fastened, for example force-fitted, to the front end of larger diameter of the web 102 is the skirt 14, to the outer peripheral edge of which the unrolling diaphragm 12 is fastened, for example by means of orifices 104 made near the edge of the skirt 14 in order to complete the attachment of the material of the diaphragm 12. The inner peripheral edge of the skirt 14 is bent in the direction of the axis X—X' so as to form a shoulder 106 interacting with a shoulder 108 formed on a sleeve 110 having a front annular face 20b intended for interacting with the reaction disk 58, as described with reference to FIG. 1.

Retained sealingly between the skirt 14 and the front end of larger diameter of the web 102 is a bead 112 forming the front end of a flexible tubular diaphragm 114, the rear end of which constitutes a bead 116 retained sealingly in the piston 20 in the zone of connection of the rear tubular part 22 to the intermediate web 102, for example by means of a cylindrical metal cup 117.

An intermediate part of the flexible tubular diaphragm 114 receives an annular insert 118 on its rear face, so as to make it rigid in a plane perpendicular to the axis X—X'. The diaphragm 114 and the insert 118 have respective orifices 120 and 122 arranged opposite one another.

It will therefore be seen that the diaphragm part 114 made rigid by the insert 118 can be displaced axially in the annular volume 123 located between the rear face of the skirt 14 and the front face of the intermediate piston web 102, the skirt 14 and the web 102 being fixed to one another, the web 102 itself being the forward extension of the tubular rear part 22 of the piston.

The plunger 32 is formed with a rear part 124 sliding in the bore 30 of the tubular part 22 and a front part 126 sliding within the sleeve 110. Produced integrally between the rear 124 and front 126 parts of the plunger 32 is an extension 128 extending first radially outwards to form an annular part 130 and then, from the outer peripheral edge of the latter, axially forwards within the tubular part 22 to form a cylindrical part 132 extending around the sleeve 110 and penetrating into the annular volume 123. The front end of the cylindrical part 132 is itself extended radially outwards by an annular part 134 which comes into the annular volume 123 in front of the part of the diaphragm 114 made rigid by the insert 118 and the outside diameter of which is slightly larger than the inside diameter of the insert 118. The annular part 134 possesses on its outer peripheral edge a bulge 136 capable of forming a first valve seat with the diaphragm 114 which is made rigid by the insert 118 and which itself forms a shutter 138.

A second valve seat 140 is formed by a bulge on the rear face of the skirt 14 over a circle of a diameter slightly smaller than the outside diameter of the insert 118. The bulge 140 can advantageously be formed on a convex part of the rear face of the skirt 14, so that the corresponding concave part of the front face of the skirt 14 forms a receptacle for the compression spring 28. Alternatively, it is possible for this part of the rear face of the skirt 14 to be plane and for a bulge to be formed over the above-defined circle on the front surface of the diaphragm 114 made rigid by the insert 118.

Orifices 142 are made in the skirt 14 in order to put the front chamber 16 in communication with the part of the annular volume 123 located in front of the shutter 138. Likewise, orifices 144 are made in the intermediate web 102 in order to put the rear chamber 18 in communication with the part of the annular volume 123 located behind the shutter 138. Finally, orifices 146 are made in the rear part 124 of the plunger 32 in order to put the annular space 36 behind the plunger 32, where atmospheric pressure prevails, in communication with the annular volume 123 by way of the annular space 148 between the cylindrical part 132 of the plunger 32 and the tubular part 22 of the piston.

The shutter 138 possesses, for example by means of the insert 118, prolongations 150 uniformly distributed along a circumference, directed axially rearwards, located opposite the orifices 144 of the web 102 and penetrating into these.

The booster possesses, in its tubular central part extending the rear wall of the casing 10 rearwards, a stop member 152 taking the form, in the example illustrated, of a cylindrical brace 152, for example force-fitted into this tubular central part so as to be fixed to it. This brace 152 has a shoulder 154 forming a stop with a shoulder 156 formed on the piston 20 when it is returned to the rear rest position by the spring 28 acting on the skirt 14.

The plunger 32 and the control rod 34 are returned to their rear rest position by a return spring 158 bearing, on the one hand, on the rear face of the part of the skirt 14 forming the shoulder 106 and, on the other hand, on the front face of the annular part 130 of the extension 128 of the plunger 32. In its rear rest position, the plunger 32, comes by means of the first valve seat 136, up against the shutter 138, itself up against the front annular face of the sleeve 152 by means of the prolongations 150. On the other hand, the shutter 138 is stressed forwards by a shutter spring 160 bearing, on the one hand, on the rear face of the diaphragm 114 made rigid by the insert 118 and forming the shutter 138 and, on the other hand, on the front face of the bead 116 retained in the cup 117.

It can thus be seen that, according to the invention, there has been provided a booster comprising a composite movable piston consisting of the skirt 14 equipped with the unrolling diaphragm 12 and fixed to the intermediate web 102, itself extended rearwards by the tubular rear part 22, this movable piston being capable of acting on the push rod 56 via the reaction disk 58 by means of the front annular face 20b of the sleeve 110, the latter also serving as a guide element for the plunger 32.

The valve means consist of the shutter 138 which is formed on an intermediate part of a tubular diaphragm fastened at its ends to the composite piston and which interacts with a valve seat 136 formed on the plunger and a valve seat 140 formed on the composite piston.

Moreover, the valve means is located in front of the forward end of the plunger 32, and more precisely in front of the part of the casing extending perpendicularly to the axis X—X'. This results in the advantage that the invention may be used with conventional booster casings, without the necessity for the latter to have a special design.

The functioning of this booster produced according to the invention is easily inferred from the foregoing explanations. With the booster at rest, as shown in FIG. 2, the front chamber 16 is in communication with the rear chamber 18 via the orifices 142, the valve passage 140-138 in the volume 123 and the orifices 120, 122 and 144. The effect of actuating the control rod 34 is to cause the plunger 32 to advance counter to the action of the spring 158. The shutter 138 remains laid on the valve seat 136 of the plunger 32 under the action of the spring 160, until it comes into contact with the valve seat 140 of the movable partition, thereby closing the valve passage 140-138 and isolating the front 16 and rear 18 chambers from one another.

As seen above, this operating phase corresponds to the idle travel of the booster. As a result of this invention, this idle travel can be set to any desired value and, in particular, can be made as low as desired. In fact, it has been seen that, in the rest position of the booster, the piston 20 is at a rear stop by means of its shoulder 156 bearing on the shoulder 154 of the brace 152. The plunger 32 being stressed rearwards by the spring 158 bearing on the rear face of the skirt 14, and being at a rear stop by means of the first valve seat 136 on the shutter 138, stressed forwards by the spring 160 of lower rigidity than the spring 158, the axial extensions 150 of the insert 118 are themselves stressed rearwards, until their rear ends come to bear on the front annular face of the brace 152.

It will therefore be seen that the brace 152 determines the rear position of the piston 20 via the shoulders 154 and 156 and consequently that of the valve seat 140 formed on the piston 20, and simultaneously the rear position of the plunger 32 via the axial extensions 150 and the shutter 138 and consequently that of the valve seat 136 formed on the plunger 32. It will thus be appreciated that the idle travel of the booster is determined by the dimension between the shoulder 154 of the brace 152 and the annular front face of the brace. This dimension can therefore be determined accurately so that, at rest, the annular valve seat 140 formed on the piston 20 is contained in a plane very slightly in front of that containing the annular valve seat 136 formed on the plunger 32. Thus, the stroke of the control rod 34 and of the plunger 32 necessary for obtaining the isolation of the front 16 and rear 18 chambers from one another, that is to say for obtaining the closing of the valve passage 138-140, can thereby be reduced to values as low as a tenth of a millimeter.

It will also be seen that, advantageously as a result of the invention, this idle travel is determined by a single dimension of one component instead of the difference between a plurality of dimensions of different components, as in the prior art. Variations in idle travel from one booster to another attributable to production tolerances in series production are therefore themselves reduced to a minimum.

It will be seen, further, that, likewise advantageously as a result of the invention, the relative rest position of the first 136 and second 140 valve seats is perfectly defined by a single stop member, the brace 152. Since the latter is fixed to part of the casing 10 of the booster, its position in the booster need not be defined with very high accuracy.

So as not to limit the effective stroke of the piston 20, it is therefore sufficient to fit the brace 152 into the booster as far to the rear as possible, but preventing the piston 20 coming, at rest, with its skirt 14 or with its intermediate web 102 into contact with the rear part of the casing 10. In fact, in this case, the brace 152 would no longer perform its function as a stop member both for the piston 20 and for the plunger 32 and consequently of adjusting the idle travel.

In the second operating phase of the booster, by continuing to actuate the control rod 34 and the plunger 32, the cylindrical part 132 of the latter continues to penetrate into the volume 123. The shutter 138 then comes to bear on the valve seat 140 of the piston, while the valve seat 136 of the plunger 32 moves away from the shutter 138.

Air at atmospheric pressure can then penetrate into the rear chamber 18 via the orifices 146 in the rear part of the plunger 32, the annular space 148 between the cylindrical part 132 of the plunger 32 and the tubular part 22 of the piston, the valve passage 136-138, the orifices 120 and 122 formed in the diaphragm 114 and the insert 118, and finally the orifices 144 in the intermediate web 102.

It will thus be seen that, by means of the invention, the air is admitted into the rear chamber 18 by way of the valve passage 136-138 which is of a diameter several times larger than in a conventional booster, as described with reference to FIG. 1. It has thus been possible to produce valve passages 136-138 of a diameter equal to five times the diameter of a conventional valve passage. It follows, in this example, that the passage cross-section presented to the air is itself multiplied by five, and therefore that the air flow towards the rear chamber is also multiplied by five. A booster which functions silently, since such an enlarged passage cross-section allows the air to circulate, without causing suction noises and other whistling. It goes without saying that the value of five is not critical, but has merely been selected as an example.

Any other factor of enlargement of the valve passage in relation to a conventional booster can be selected according to the desired results.

It will be appreciated that the same phenomenon of a reduction of the operating noise of the booster occurs during a brake release. In fact, when the force applied to the control rod decreases, the latter retracts and in its movement drives the plunger 32. The valve seat 136 of the plunger 32 thereby returns into contact with the shutter 138, the valve seat 140 still being in contact with the shutter 138.

When the plunger 32 continues to retract, the valve seat 136 of the plunger then causes the shutter 138 to move away from the valve seat 140. The air contained in the rear chamber 18 is then sucked into the front chamber via the orifices 144 in the intermediate web 102, the orifices 122 and 120 in the diaphragm 114 and the insert 118, the valve passage 138-140 and finally the orifices 142 in the skirt 14. It can therefore be seen that, here again, the air is made to flow through the valve passage 138-140 of a diameter clearly larger than that of conventional valve passages and therefore of a larger surface which allows a higher flow, thus resulting in silent functioning in the brake-release phase.

It will thus be seen that, as a result of the arrangement of the valve seats 136 of the plunger and 140 of the piston and of the shutter 138, the fluid flow between the atmosphere and rear chamber and between the rear chamber and front chamber is increased to an appreciable extent, proportionately reducing the operating noises of the booster both in the braking phase and in the brake-release phase.

The invention makes it possible, furthermore, greatly to reduce the operating noise of the booster attributable to the turbulence of the air circulating in the booster. It has been seen, in fact, that, during braking, the air flows via the orifices 146, the annular space 148, the valve passage 136-138 and the orifices 120, 122 and 144 and, during brake release, via the orifices 144, 122 and 120, the valve passage 138-140 and the orifices 142. The special design of the booster according to the invention makes it possible to ensure that the orifices 142, 120, 122, 144 and 146 are of equal number and uniformly distributed about the axis X—X' and so that their centers are in the same plane, as illustrated in FIG. 2. Thus, the air masses set in motion during the functioning of the booster of the present invention will have a speed of which the components will be contained only in one plane, for example that of FIG. 2. In other words, the flow of air in the booster is perfectly symmetrical about the axis X—X' under all operating conditions, that is to say all the turbulence and the noises resulting from it are eliminated.

It can therefore be seen clearly that, according to the present invention, there has been provided a pneumatic booster, in which the special arrangement of the valve means allows it to function with an extremely small idle travel and silently. Of course, the invention is not limited to the embodiment described by way of example, but is capable of acquiring many alternative versions which will be apparent to an average person skilled in the art. Thus, for example, the unrolling diaphragm and the flexible tubular diaphragm on which the shutter is formed can be produced in one piece. Likewise, the invention can be applied to boosters in tandem or with an additional chamber.

We claim:

1. A pneumatic brake-booster, comprising a casing within which is located a piston comprising a rear tubular part supporting a skirt and, by means of an unrolling diaphragm, defining a front chamber connected permanently to a vacuum source and a rear chamber connected selectively to one of the front chamber and atmosphere by valve means actuated by a control rod capable of bearing by means of a plunger on one face of a reaction disk adjacent a push rod, the valve means comprising a shutter interacting, by an active rigid part having an insert, with a first valve seat located at the plunger and with a second valve seat located at the piston, and the shutter comprising a flexible tubular diaphragm, the active rigid part of the shutter located between two ends of the flexible tubular diaphragm, and a stop member determining simultaneously a rest position of the piston and a rest position of the plunger, characterized in that the piston comprises an intermediate piston web defining with the skirt of the piston an annular volume, the first and second valve seats and the shutter defining portions of the perimeter of the annular volume, the second valve seat located at the skirt of the piston, orifices located in the skirt in order to put the front chamber in communication with the annular volume, and orifices located in the intermediate web in order to put the rear chamber in communication with the annular volume.

2. The booster according to claim 1, characterized in that the shutter comprises orifices allowing communication between the front chamber and rear chamber.

3. The booster according to claim 2, characterized in that the orifices in the shutter are located in the active rigid part between the first valve seat and second valve seat.

4. The booster according to claim 3, characterized in that a rest position of the plunger is determined by extensions of the shutter coming up against the stop member.

5. The booster according to claim 4, characterized in that the extensions of the shutter penetrate into the orifices of the intermediate piston web.

6. The booster according to claim 1, characterized in that orifices are located in the plunger in order to put the annular volume in communication with atmosphere.

7. The booster according to claim 6, characterized in that the orifices in the plunger, shutter, skirt, and intermediate piston web are distributed uniformly about an axis of symmetry of the booster, are of equal number, and are aligned about the axis of symmetry to have centers located in linear alignment.

* * * * *